Sept. 16, 1930.   H. H. BAUT   1,775,803
ADJUSTABLE BALL BEARING
Filed Nov. 10, 1928
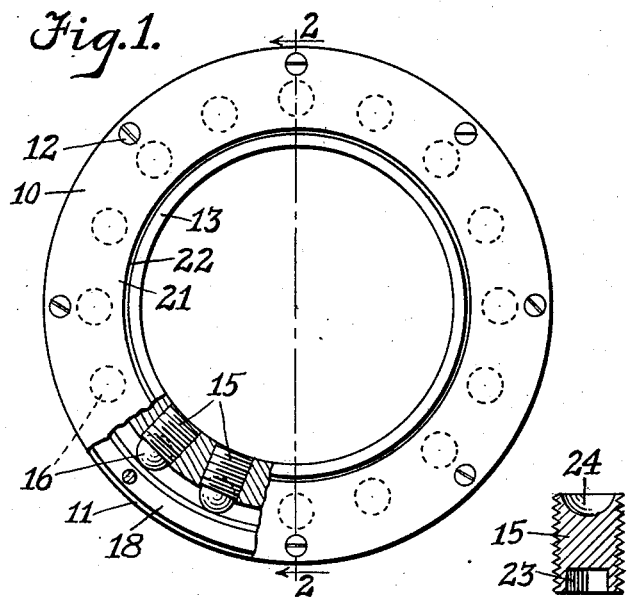
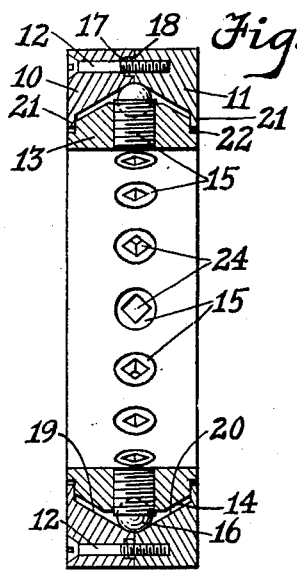
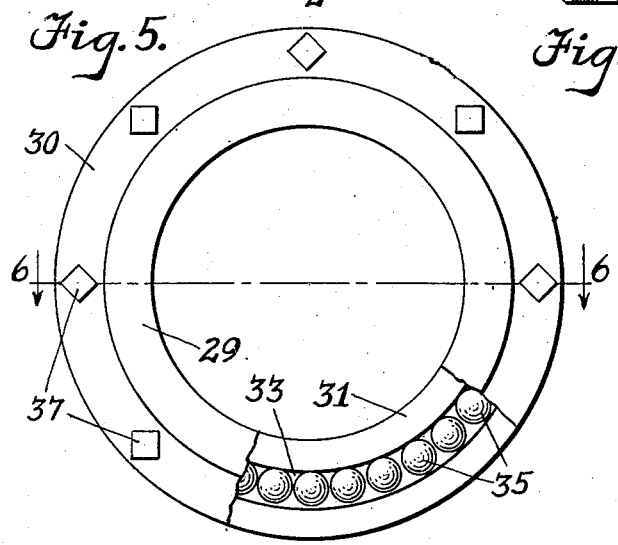
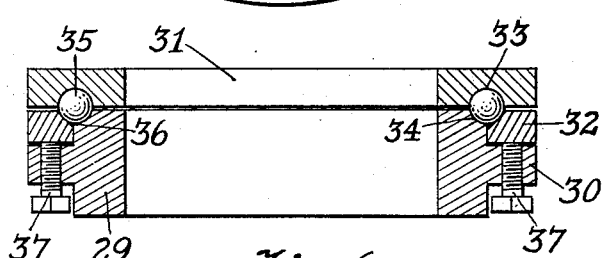
INVENTOR,
Harry H. Baut
BY A. H. Martell
ATTORNEY.

Patented Sept. 16, 1930

1,775,803

UNITED STATES PATENT OFFICE

HARRY H. BAUT, OF LOS ANGELES, CALIFORNIA

ADJUSTABLE BALL BEARING

Application filed November 10, 1928. Serial No. 318,373.

My invention relates to ball bearings or roller bearings and more particularly to an adjustable bearing of the ball roller type.

The primary object of my invention is to provide an adjustable bearing, of the character described, having parts of sufficient thickness to be tapped for fastening screws whereby they may be attached to discs or sheet metal parts.

A further object is to provide a dust proof ball or roller bearing with renewable parts which may be replaced when they become worn out or broken.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof, Fig. 1 is a side view of a ball bearing embodying the principles of my invention.

Fig. 2 is a sectional view of the ball bearing shown in Fig. 1, the section being taken on line 2—2 of that figure.

Fig. 3 is an enlarged sectional view of one of the ball-seat plugs or screw plugs forming part of the bearing shown in Figs. 1 and 2.

Fig. 4 is a sectional view, similar to Fig. 2, of a modified form of adjustable ball bearing.

Fig. 5 is a view similar to Fig. 1, of a further modified form of adustable ball bearing.

Fig. 6 is a sectional view of the ball bearing shown in Fig. 5, the section being taken on line 6—6 of that figure.

The bearing shown in Figs. 1 and 2 comprises a pair of complementary outer rings 10 and 11 held in fixed relation to each other by a series of equally spaced screws 12, an inner ring 13 having a crowned or V-shaped peripheral face 14, and a series of uniformly spaced screw-plugs 15 extending radially through the middle and thickest part of inner ring 13 and a series of balls 16, corresponding in number to said screw plugs 15. The joining faces of outer rings 10 and 11 are equipped with an annular groove 17 in the former and an annular tongue 18 on the latter adapted to enter groove 17 and form a tight fitting joint. The inner faces 19 and 20 of outer rings 10 and 11, respectively, are beveled to conform to the peripheral face 14 of inner ring 13 and internal flanges 21 are formed on the outer edges of rings 10 and 11 which are adapted to run freely in complementary grooves 22 cut in the outer edges of inner ring 13. The purpose of flanges 21 is to exclude dust from the space between the inner and outer rings.

The length of screw-plugs 15 corresponds approximately to the thickness of the middle part of inner ring 13 and their inner ends are recessed as at 23 to receive a square or hexagonal wrench whereby they may be turned to make adjustments. The outer ends of screw-plugs 15 are provided with hemispherical recesses or sockets 24 adapted to receive balls 16.

Obviously, the inner and outer rings of this bearing have sufficient metal to permit of their being tapped for fastening screws whereby they may be attached to the different members with which they are to be used. Either may be fixed so that the other will turn upon it or within it, balls 16 turning in sockets 24, in which they are seated, as one revolves in relation to the other.

The modified bearing shown in Fig. 3 is similarly constructed, except that screw-plugs 15 are omitted and an adjustable ring 25 of triangular cross-section is provided instead, a square groove 26 being cut in the inner face of one of the outer rings 10 or 11 to receive it. A series of equally spaced adjusting screws 27 are also provided in the outer ring having groove 26, adapted to hold adjusting ring 25 in contact with the balls 16. In this case a peripheral groove 28 is cut in the middle of inner ring 13 to serve as a ball race.

It is evident that any looseness of the bearing thus constructed, due to wear or imperfect construction, readily may be taken up by turning adjusting screws 27 so as to press ring 25 inwardly and that when ring 25 becomes worn or broken it may be replaced easily by a new one.

The modified type of bearing shown in Figs. 5 and 6 is designed more particularly for use in a horizontal position. It comprises a relatively heavy lower ring 29, with a peripheral flange 30, a relatively light upper ring 31, having an internal and external diameter corresponding to those of lower ring 29, and an intermediate adjusting ring 32, fitting loosely between upper ring 31 and flange 30 of lower ring 29. A semicircular annular groove 33 is cut in the lower face of upper ring 31 and a complementary quadrant groove 34 is cut in the adjacent corner of lower ring 29. These co-operate to form a ball race in which balls 35 run. The upper and inner corner of adjusting ring 32 is beveled as at 36, thus adapting it to co-operate with grooves 33 and 34 in completing the ball race. Adjusting screws 37 extending upwardly through flange 30 of ring 29, with their ends in contact with the under side of ring 32 are provided at uniformly spaced intervals around lower ring 29.

As is evident, the adjustment of this type of bearing is accomplished by turning screws 37 upwardly so as to force ring 32 toward upper ring 31. While ball bearings only are shown in the drawings, obviously the construction may be modified to produce similar roller bearings.

My bearing may be used for various purposes. It is particularly useful in journal boxes and in the ends of connecting rods for taking the wear therein.

Having thus illustrated and described my invention, I claim:

A ball bearing comprising an outer ring made of two complementary parts detachably fixed together so as to form a ball race in the joint thereof, one of said parts having a groove cut in its inner face adjacent the joint; an adjusting ring loosely fitting in said groove; adjusting screws in said outer ring adapted to actuate said adjusting ring; an inner ring fitting loosely within said outer ring; a peripheral groove in said inner ring adapted to form a ball race, co-operatively with said outer ring and said adjusting ring, and balls in said peripheral groove adapted to run between said outer ring, said inner ring, and said adjusting ring.

HARRY H. BAUT.